United States Patent
Sakai et al.

(10) Patent No.: US 10,498,457 B2
(45) Date of Patent: Dec. 3, 2019

(54) OPTICAL CARRIER-SUPPRESSED SIGNAL GENERATOR

(71) Applicant: SUMITOMO OSAKA CEMENT CO., LTD., Chiyoda-ku, Tokyo (JP)

(72) Inventors: Takeshi Sakai, Tokyo (JP); Masahito Mure, Tokyo (JP); Junichiro Ichikawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 1570 days.

(21) Appl. No.: 14/348,237

(22) PCT Filed: Sep. 28, 2012

(86) PCT No.: PCT/JP2012/075229
§ 371 (c)(1),
(2) Date: Nov. 24, 2014

(87) PCT Pub. No.: WO2013/047829
PCT Pub. Date: Apr. 4, 2013

(65) Prior Publication Data
US 2015/0093120 A1    Apr. 2, 2015

(30) Foreign Application Priority Data
Sep. 30, 2011    (JP) ................. 2011-217794

(51) Int. Cl.
*H04B 10/548* (2013.01)
*H04B 10/516* (2013.01)
(Continued)

(52) U.S. Cl.
CPC ....... *H04B 10/548* (2013.01); *H04B 10/5053* (2013.01); *H04B 10/5057* (2013.01); *H04B 10/5165* (2013.01); *H04B 10/564* (2013.01)

(58) Field of Classification Search
CPC ............ H04B 10/5057; H04B 10/5165; H04B 10/548; H04B 10/564; H04B 10/5053
(Continued)

(56) References Cited

U.S. PATENT DOCUMENTS 4,287,606 A * 9/1981 Frosch ................. H04B 10/548
    398/158
5,301,058 A * 4/1994 Olshansky ............ G02F 1/0327
    359/246
(Continued)

FOREIGN PATENT DOCUMENTS

EP    2015129 A1    1/2009
JP    A-2004-318052    11/2004
(Continued)

OTHER PUBLICATIONS

Higuma et al. "Wavelength dependence of high extinction-ratio LN modulator using an optical FSK modulator" *Proceedings of IEICE Electronics Society Conference.* 2005. (4 pages).
(Continued)

*Primary Examiner* — Amritbir K Sandhu
(74) *Attorney, Agent, or Firm* — Merchant & Gould P.C.

(57) ABSTRACT

It is possible to suppress carrier light with a simple configuration when modulating the carrier light to generate optical sideband components. An optical carrier-suppressed signal generator includes first splitting means used to split input carrier light into two light beams, an optical modulator which modulates one split carrier light beam and outputs light including optical sideband components, a phase modulator which phase-modulates another split carrier light beam, and second or third splitting means used to split the output light of the optical modulator into two light beams. The output light split by the second or third splitting means and the output light of the phase modulator are multiplexed to obtain the amplitude of the signal waveform of optical power, and the optical modulator is controlled such that the obtained value is minimized.

4 Claims, 6 Drawing Sheets

(51) Int. Cl.
*H04B 10/564* (2013.01)
*H04B 10/50* (2013.01)

(58) Field of Classification Search
USPC .......................................... 398/182, 183, 188
See application file for complete search history.

(56) References Cited

U.S. PATENT DOCUMENTS

| | | | | |
|---|---|---|---|---|
| 5,532,857 | A * | 7/1996 | Gertel | H04B 10/5057 |
| | | | | 398/183 |
| 6,661,976 | B1 * | 12/2003 | Gnauck | H04B 10/505 |
| | | | | 375/301 |
| 6,728,490 | B1 * | 4/2004 | Ohhira | H04B 10/5053 |
| | | | | 398/142 |
| 6,970,655 | B2 * | 11/2005 | Ono | H04B 10/505 |
| | | | | 398/186 |
| 7,515,833 | B2 * | 4/2009 | Way | G02F 1/0356 |
| | | | | 359/245 |
| 7,751,724 | B2 * | 7/2010 | Hashimoto | G02F 1/2255 |
| | | | | 359/236 |
| 7,817,923 | B2 * | 10/2010 | Akiyama | G02F 1/0123 |
| | | | | 398/183 |
| 8,145,069 | B2 * | 3/2012 | Tanaka | H04B 10/505 |
| | | | | 398/182 |
| 8,867,042 | B2 * | 10/2014 | Kawanishi | G02B 6/29355 |
| | | | | 356/450 |
| 9,081,139 | B2 * | 7/2015 | Okamura | G02B 6/125 |
| 9,250,455 | B2 * | 2/2016 | Hosokawa | H04B 10/5053 |
| 9,448,457 | B2 * | 9/2016 | Itou | H04B 10/5053 |
| 9,897,826 | B2 * | 2/2018 | Katou | G02F 1/0322 |
| 2004/0033021 | A1 * | 2/2004 | Oguri | G02B 6/29319 |
| | | | | 385/37 |
| 2008/0037999 | A1 * | 2/2008 | Masuda | H04B 1/69 |
| | | | | 398/186 |
| 2008/0181620 | A1 * | 7/2008 | Sasaki | H04B 10/5053 |
| | | | | 398/198 |
| 2009/0052013 | A1 * | 2/2009 | Higuma | G02F 1/011 |
| | | | | 359/333 |
| 2009/0097795 | A1 * | 4/2009 | Higuma | G02F 1/0123 |
| | | | | 385/3 |
| 2009/0153948 | A1 * | 6/2009 | Ichikawa | G02F 1/3534 |
| | | | | 359/330 |
| 2011/0052212 | A1 * | 3/2011 | Mure | H04B 10/677 |
| | | | | 398/202 |
| 2015/0093120 | A1 * | 4/2015 | Sakai | H04B 10/5165 |
| | | | | 398/188 |
| 2016/0156418 | A1 * | 6/2016 | Yamanaka | H04B 10/564 |
| | | | | 398/38 |

FOREIGN PATENT DOCUMENTS

| | | |
|---|---|---|
| JP | A-2005-134897 | 5/2005 |
| JP | A-2005-265959 | 9/2005 |
| JP | A-2005-274806 | 10/2005 |
| JP | A-2006-242975 | 9/2006 |
| JP | A-2007-219063 | 8/2007 |
| JP | A-2007-286547 | 11/2007 |
| JP | A-2008-039809 | 2/2008 |
| JP | A-2009-080189 | 4/2009 |
| JP | A-2010-078845 | 4/2010 |
| JP | A-2011-075913 | 4/2011 |

OTHER PUBLICATIONS

Unknown. "Measurement method of a half-wavelength voltage for Mach-Zehnder optical modulators in wireless communication and broadcasting systems." *IEC/PAC 62593 Edition 1.0.* 2008. (40 pages).

Matsumoto et al. "Microwave Phase Shifter Using Optical Waveguide Structure." *J. of Lightwave Tech.* vol. 9. No. 11. 1991. pp. 1523-1527.

International Search Report for International Application No. PCT/JP2012/075229 dated Nov. 6, 2012 (4 pages).

European Search Report for European Patent Application No. 12834969.3 (dated Aug. 13, 2015).

* cited by examiner (A) WHEN POWER OF CARRIER LIGHT $f_0$ IS LARGE (B) WHEN POWER OF CARRIER LIGHT $f_0$ IS SMALL

OPTICAL CARRIER-SUPPRESSED SIGNAL GENERATOR

This application is a U.S. National Stage Application under 35 U.S.C. § 371 of International Patent Application No. PCT/JP2012/075229 filed 28 Sep. 2012, which claims the benefit of priority to Japanese Patent Application No. 2011-217794 filed 30 Sep. 2011, the disclosures of all of which are hereby incorporated by reference in their entireties. The International Application was published in Japanese on 4 Apr. 2013 as WO 2013/047829.

TECHNICAL FIELD

The present invention relates to a technique which suppresses carrier light when modulating the carrier light to generate optical sideband components.

BACKGROUND

In an optical communication system which appends signals to light and transmits light through an optical fiber, a light intensity modulator which modulates the intensity of laser light emitted from a light source to generate an optical signal is used. The light intensity modulator has a configuration in which, for example, a Mach-Zehnder optical waveguide, a modulation electrode, a bias electrode, and the like are formed on an electro-optical crystal substrate, such as lithium niobate (LiNbO$_3$; hereinafter, abbreviated as LN).

The Mach-Zehnder optical waveguide has a waveguide configuration having a splitting portion which splits input light, two arms which allow split light to propagate therethrough, and a multiplexing portion which merges light propagating through the arms. In the multiplexing portion, when two light beams to be merged are in the same phase, an on state in which light waves are output to strengthen each other is placed, and when two light beams are in the opposite phase, an off state in which light waves cancel each other and output light is eliminated is placed. The ratio of the output light intensity in the on state and the output light intensity in the off state is called an extinction ratio and is an important index which represents performance of the light intensity modulator. As the extinction ratio is high, that is, as the difference in output light intensity between the on state and the off state is large, in general, the modulation depth increases, and high-quality optical transmission can be performed.

Most ideally, the output in the off state is zero, and at this time, the extinction ratio is infinite. In order to produce this situation, it is necessary that two light beams to be merged have the same intensity. However, usually, since the split ratio of the splitting portion differs from each other due to a manufacturing error of an optical waveguide or the like, and propagation loss differs between the two arms, the two merged light beams are asymmetrical in intensity. In this case, even if the two light beams are in opposite phases, the two light beams do not completely cancel each other, and the extinction ratio is deteriorated.

As a method which makes two light beams in the multiplexing portion symmetrical in intensity and improves the extinction ratio, for example, a method of irradiating an eximer laser onto an arm having large split power, causing a waveguide defect in order to increase loss, and taking intensity balance with light passing through the other arm, is considered. However, in this method, there is a problem in that loss due to defects depends on wavelength, and the extinction ratio also depends on wavelength.

On the other hand, in a so-called nested modulator (optical SSB modulator) in which sub Mach-Zehnder optical waveguides are respectively provided in two arms of a main Mach-Zehnder optical waveguide, an optical FSK (Frequency Shift Keying) modulator in which RF modulation is performed in each sub Mach-Zehnder optical waveguide to generate optical sideband components (upper and lower sidebands) above and under a frequency, and optical sideband components is switched on the upper side and the lower side and is output as frequency-modulated signal light by selecting a phase corresponding to a data signal in the main Mach-Zehnder optical waveguide has been developed (for example, see PTL 1). In recent years, a light intensity modulator in which a sub Mach-Zehnder optical waveguide is used as a light quantity adjustment unit, and the above-described optical FSK modulator is operated as the above-described light intensity modulator, thereby achieving a high extinction ratio, has been suggested (for example, see NPL 1).

CITATION LIST

Patent Literature

[PTL 1] Japanese Unexamined Patent Application Publication No. 2005-134897
[PTL 2] Japanese Unexamined Patent Application Publication No. 2007-286547

Non Patent Literature

[NPL 1] Higuma et. al, Wavelength dependence of a high extinction-ratio LN modulator using an optical FSK modulator, "2005, Proceedings of the Society Conference of IEICE", September, 2005, C-3-2
[NPL 2] IEC Publicly Available Specification "Measurement method of a half-wavelength voltage for Mach-Zehnder optical modulators in wireless communication and broadcasting systems," IEC/PAS 62593 Edition 1.0 2008-11

SUMMARY

Technical Problem

In the light intensity modulator described in NPL 1, when performing light quantity adjustment of the sub Mach-Zehnder optical waveguide, the output light intensity of the light intensity modulator is simply monitored. In this case, if modulation to the main Mach-Zehnder optical waveguide is performed simultaneously, light quantity adjustment based on the monitored light intensity is impossible. For this reason, it is necessary to perform light quantity adjustment in a state where modulation is not performed (that is, prior to actual operation of the light intensity modulator), and there is a problem in that it is not possible to realize and maintain a high extinction ratio in real time due to, for example, environmental changes or the like.

Accordingly, as a technique which can cope with this problem, PTL 2 has been known. However, in PTL 2, since an optical filter is used to cut carrier light from output light of an optical modulator, when the wavelength difference between carrier light and optical sideband components by modulation is small, the wavelength characteristic of the optical filter should be extremely steep. In the present situation, there is a limit to a fiber grating system in which the wavelength characteristic is steep, and this system requires strict temperature control of an optical filter unit to maintain the wavelength characteristic and is expensive. This system has a limited wavelength adjustment range, and for example, it is not possible to cope with carrier light having a wavelength of 1540 nm and carrier light having a wavelength of 1580 nm with one optical filter. There is a limit to a technique which makes the wavelength characteristic of the optical filter steep, and even if a fiber grating having a special configuration is used, it is difficult to cope with a situation in which the wavelength difference between carrier light and modulated optical sideband components is equal to or less than 0.008 nm (1 GHz of the frequency difference in the band of wavelength 1550 nm). Even when a so-called single Mach-Zehnder optical modulator having no sub Mach-Zehnder is used, the problem described above occurs.

The invention has been accomplished in consideration of the above-described point, and an object of the invention is to provide an optical carrier-suppressed signal generator capable of suppressing carrier light with a simple configuration when modulating the carrier light to generate optical sideband components, unlike the configuration of the related art.

Solution to Problem

The invention has been obtained in order to solve the above-described problem, and an optical carrier-suppressed signal generator according to a first aspect of the invention includes first splitting means used to split input carrier light into two light beams 1A and 1B, an optical modulator which modulates one split carrier light beam 1A and outputs light including optical sideband components, a phase modulator which phase-modulates the other split carrier light beam 1B, second splitting means used to split the output light of the optical modulator into two light beams 2A and 2B, third splitting means used to split one output light beam 2A of the second splitting means into two light beams 3A and 3B, optical multiplexing means used to multiplex one output light beam 3B of the third splitting means and the output light of the phase modulator, first light-detection means used to detect the output light of the optical multiplexing means, second light-detection means used to detect the other output light beam 2B of the second splitting means, and control means used to control the optical modulator such that the amplitude of the time waveform of optical power detected by the first light-detection means is minimized and the mean value of optical power detected by the second light-detection means is maximized.

An optical carrier-suppressed signal generator according to a second aspect of the invention includes first splitting means used to split input carrier light into two light beams 1A and 1B, an optical modulator which modulates one split carrier light beam 1A and outputs light including optical sideband components, a phase modulator which phase-modulates the other split carrier light beam 1B, second splitting means used to split the output light of the optical modulator into two light beams 2A and 2B, optical multiplexing means used to multiplex one output light beam 2B of the second splitting means and the output light of the phase modulator, light-detection means used to detect the output light of the optical multiplexing means, a $f_{0\_IM}$ filter which, after the output light beam 2B including the sideband light and the output light of the phase modulator interfere with each other in the optical multiplexing means, and the interference light is detected by the light-detection means as an optical signal having an interference signal of an integer multiple of a modulation frequency $f_k$ of the phase modulator and converted to an electrical signal, extracts only a $f_{0\_IM}$ component of an integer multiple of the modulation frequency $f_k$ from the electrical signal output from the light-detection means, a mean value filter which extracts only a frequency component equal to or lower than the modulation frequency $f_k$ from the electrical signal output from the light-detection means, and control means used to output a control signal to the optical modulator on the basis of output signals from the two filters, in which the control means outputs the control signal to the optical modulator such that the amplitude of the time waveform of the output signal from the $f_{0\_IM}$ filter is minimized and the output of the output signal from the mean value filter is maximized.

An optical carrier-suppressed signal generator according to a third aspect of the invention includes first splitting means used to split input carrier light into two light beams 1A and 1B, an optical modulator which modulates one split carrier light beam 1A and outputs light including optical sideband components, a phase modulator which phase-modulates the other split carrier light beam 1B, second splitting means used to split the output light of the optical modulator into two light beams 2A and 2B, multiplexing/demultiplexing means used to multiplex one output light beam 2B of the second splitting means and the output light of the phase modulator and then splitting the multiplexed light into two light beams M1 and M2 at a given split ratio, first light-detection means used to receive one split light beam M1 output from the multiplexing/demultiplexing means and outputting an electrical signal in accordance with the intensity of the received light signal, second light-detection means used to receive the other split light beam M2 output from the multiplexing/demultiplexing means and used to output an electrical signal in accordance with the intensity of the received light signal, addition means used to add the electrical signal from the first light-detection means and the electrical signal from the second light-detection means and outputting the result, subtraction means used to output the difference between the electrical signal from the first light-detection means and the electrical signal from the second light-detection means, and control means used to output a control signal to the optical modulator on the basis of an output signal from the addition means and an output signal from the subtraction means, in which the control means outputs the control signal to the optical modulator such that the amplitude of the time waveform of the output signal from the subtraction means is minimized and a DC component of the output signal from the addition means is maximized.

In the optical carrier-suppressed signal generator of the invention, the optical modulator may be an optical SSB modulator.

An optical carrier-suppressed signal generator according to a fourth aspect of the invention includes first splitting means used to split input carrier light into two light beams 1A and 1B, an optical modulator which modulates one split carrier light beam 1A and outputs light including optical sideband components, a phase modulator which phase-modulates the other split carrier light beam 1B, second splitting means used to split the output light of the optical modulator into two light beams 2A and 2B, optical multiplexing means used to multiplex one output light beam 2B of the second splitting means and the output light of the phase modulator, first light-detection means used to detect the output light of the optical multiplexing means, and control means used to control the optical modulator such that the amplitude of the time waveform of optical power detected by the first light-detection means is minimized.

In the optical carrier-suppressed signal generator of the invention, the optical modulator may be a single Mach-Zehnder optical modulator.

In the optical carrier-suppressed signal generator of the first aspect of the invention, polarization may be adjusted such that one output light beam 3B of the third splitting means and the output light of the phase modulator interfere with each other in the optical multiplexing means.

In the optical carrier-suppressed signal generator of any one of the second to fourth aspects of the invention, polarization may be adjusted such that one output light beam 2B of the second splitting means and the output light of the phase modulator interfere with each other in the optical multiplexing means or the multiplexing/demultiplexing means.

In the optical carrier-suppressed signal generator of the invention, the first splitting means may have a variable split ratio.

Advantageous Effects of Invention

According to the invention, it is possible to suppress carrier light with a simple configuration when modulating the carrier light to generate optical sideband components. According to the invention, it is not necessary to use an optical filter which requires temperature adjustment of the characteristic, there is an advantage in terms of cost, and it becomes possible to realize an optical carrier-suppressed signal generator having an optical frequency interval which cannot be achieved in a system using an optical filter.

DETAILED DESCRIPTION

Hereinafter, embodiments of the invention will be described in detail with reference to the drawings.

First Embodiment

Figure 1:
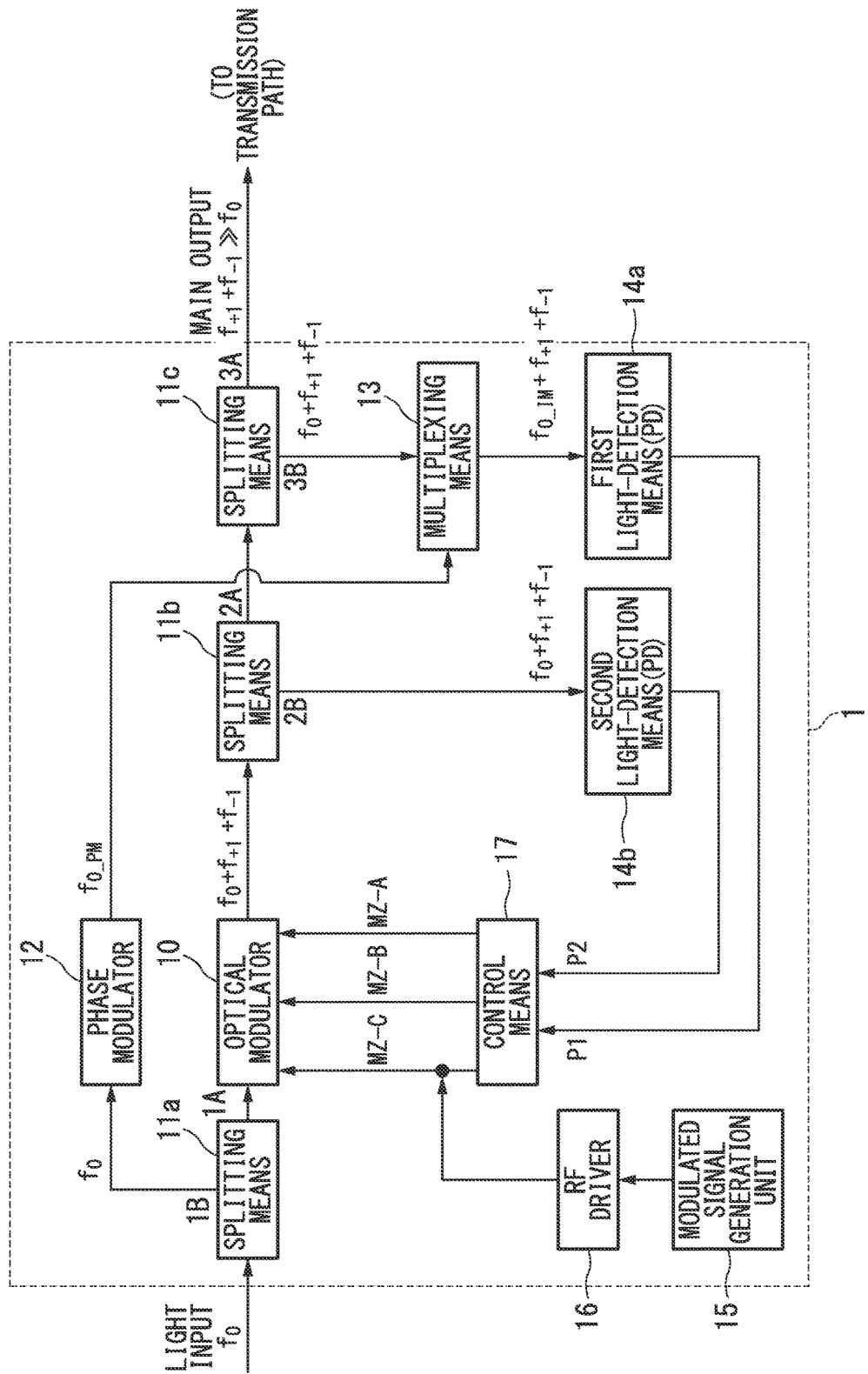
FIG. 1 is a configuration diagram of an optical carrier-suppressed signal generator according to a first embodiment of the invention.

FIG. 1 is a diagram showing the configuration of an optical carrier-suppressed signal generator 1 according to an embodiment of the invention.

In this drawing, light (carrier light) of a frequency $f_0$ which is input light to the optical carrier-suppressed signal generator 1 is split into two light beams 1A and 1B by splitting means 11a, one light beam 1A is input to an optical modulator 10, and the other light beam 1B is input to a phase modulator 12.

The optical modulator 10 modulates the input light 1A in accordance with a modulated signal of a frequency $f_m$ generated by a modulated signal generation unit 15. Accordingly, in addition to the carrier light $f_0$, light including optical sideband components of frequencies $f_{+1}$ and $f_{-1}$ different from carrier light is output from the optical modulator 10. However, the following relationships are established.

$$f_{+1} = f_0 + f_m$$

$$f_{-1} = f_0 - f_m$$

When performing modulation at the frequency $f_m$, although high-order components $f_0 \pm 2f_m$ and $f_0 \pm 3f_m$ are also generated, the high-order components are left out of consideration for simplification of description.

Output light from the optical modulator 10 is split into two light beams 2A and 2B by splitting means 11b, one light beam 2A is input to splitting means 11c, and the other light beam 2B is input to second light-detection means 14b. The input light 2A to the splitting means 11c is further split into two light beams 3A and 3B by the splitting means 11c, one light beam 3A is output to a transmission path as a main output of the optical carrier-suppressed signal generator 1, and the other light beam 3B becomes a first input to optical multiplexing means 13. The input light 2B to the second light-detection means 14b is received by the second light-detection means 14b, and an electrical signal according to light-receiving power P2 is output from the second light-detection means 14b to control means 17.

The phase modulator 12 phase-modulates the split light 1B from the splitting means 11a in accordance with a phase-modulated signal generated by the modulated signal generation unit (not shown). Accordingly, phase-modulated carrier light $f_{0\_PM}$ is output from the phase modulator 12. The phase-modulated carrier light becomes a second input to the optical multiplexing means 13. However, it is preferable that the modulation frequency $f_k$ of the phase-modulated signal is sufficiently lower than the modulation frequency $f_m$ of the optical modulator 10 since there is little influence on optical sideband components $f_{+1}$ and $f_{-1}$ to be finally obtained For example, it is preferable that the modulation frequency $f_k$ of the phase-modulated signal is equal to or lower than ½ of the modulation frequency $f_m$ of the optical modulator 10, and more preferably, equal to or lower than ⅓ of the modulation frequency $f_m$ of the optical modulator 10 considering that the modulated signal phase-modulated by the phase modulator 12 includes a harmonic component of an integer multiple of the modulation frequency $f_k$.

The phase modulator may perform modulation at Vπ or at a higher voltage in order to reduce the influence of drift or the like on interference signal amplitude. In this case, the influence of a harmonic component in phase modulation is also taken into consideration, and it is desirable that the modulation frequency $f_k$ is equal to or lower than ⅙ of the modulation frequency $f_m$ of the optical modulator 10.

For example, if the modulation frequency $f_k$ of the phase modulator 12 is about 10 Hz, although it is possible to drive and control the modulation frequency $f_m$ of the optical modulator 10 at 100 Hz, actually, the lower limit of the modulation frequency $f_m$ of the modulator 10 is restricted by a laser beam width (about 1 KHz in a most advanced ultranarrow width laser).

The first input light 3B and second input light to the optical multiplexing means 13 are multiplexed by the optical multiplexing means 13, and the multiplexed light becomes an input to first light-detection means 14a. Input light to the first light-detection means 14a is received by the first light-detection means 14a, and an electrical signal according to light-receiving power P1 is output from the first light-detection means 14a to the control means 17.

The first input light 3B to the optical multiplexing means 13 is the carrier light $f_0$ and the optical sideband components $f_{+1}$ and $f_{+1}$, and the second input light to the optical multiplexing means 13 is phase-modulated carrier light $f_{0\_PM}$. Accordingly, if the first input light 3B and the second input light are multiplexed by the optical multiplexing means 13, the carrier light $f_0$ included in the first input light 3B and the phase-modulated carrier light $f_{0\_PM}$ which is the second input light interferes with each other, and only the carrier light is intensity-modulated at the modulation frequency $f_k$ (the same modulation frequency as the phase-modulated carrier light $f_{0\_PM}$). It is assumed that polarization is adjusted by a polarization-maintaining fiber or the like such that both the carrier light $f_0$ and the phase-modulated carrier light $f_{0\_PM}$ interfere with each other. Although it is desirable that polarization is adjusted such that the maximum interference light intensity is obtained, there is no problem insofar as it is within a range in which necessary interference light intensity is obtained even if the maximum interference light intensity is not obtained.

Figure 3:
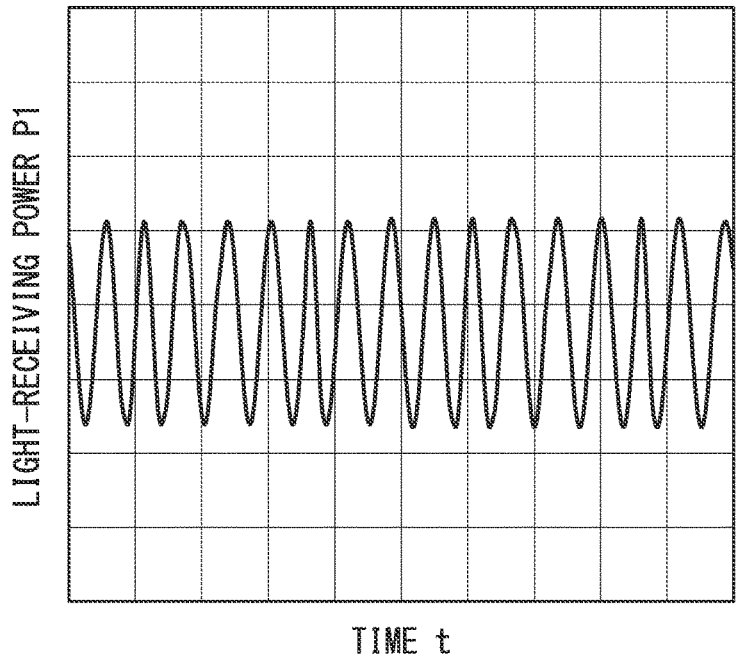
FIG. 3 is a diagram showing a time waveform which is obtained by first light-detection means.
Figure 3:
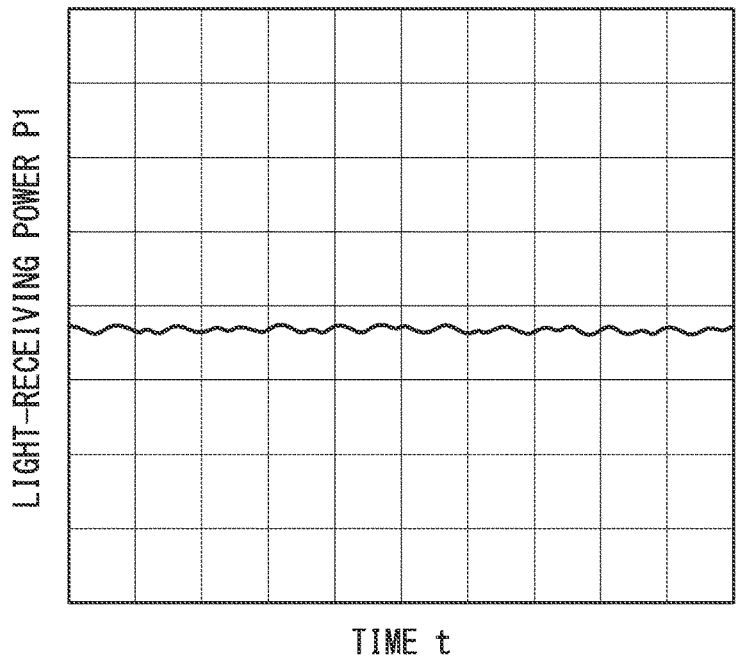

Accordingly, the carrier light $f_{0\_1M}$ which is intensity-modulated at the frequency $f_k$ and the optical sideband components $f_{+1}$ and $f_{-1}$ which are not intensity-modulated are output from the optical multiplexing means 13, and as a result, as shown in FIG. 3, a time waveform corresponding to the intensity-modulated carrier light $f_{0\_IM}$ appears in the light-receiving power P1 of the first light-detection means 14a.

On the other hand, the light-receiving power P2 of the second light-detection means 14b has a constant value with no time change, and represents power of the main output of the optical carrier-suppressed signal generator 1 having the carrier light $f_0$ and the optical sideband components $f_{+1}$ and $f_{-1}$.

The splitting means 11a, 11b, and 11c, and the optical multiplexing means 13 are, for example, a fiber-type optical coupler having a fixed split ratio. Each of the first and second light-detection means 14a and 14b has a photodiode (PD) which converts the power (intensity) of received light signal into an electrical signal.

The control means 17 generates a control signal on the basis of the light-receiving power P1 and P2, and supplies the control signal to the optical modulator 10, thereby controlling the modulation operation of the optical modulator 10. As described below, this control is performed by individually adjusting the voltages (control signals) to be applied to the respective electrodes of three Mach-Zehnder optical waveguides (MZ-A, MZ-B, and MZ-C) constituting the optical modulator 10.

Figure 2:
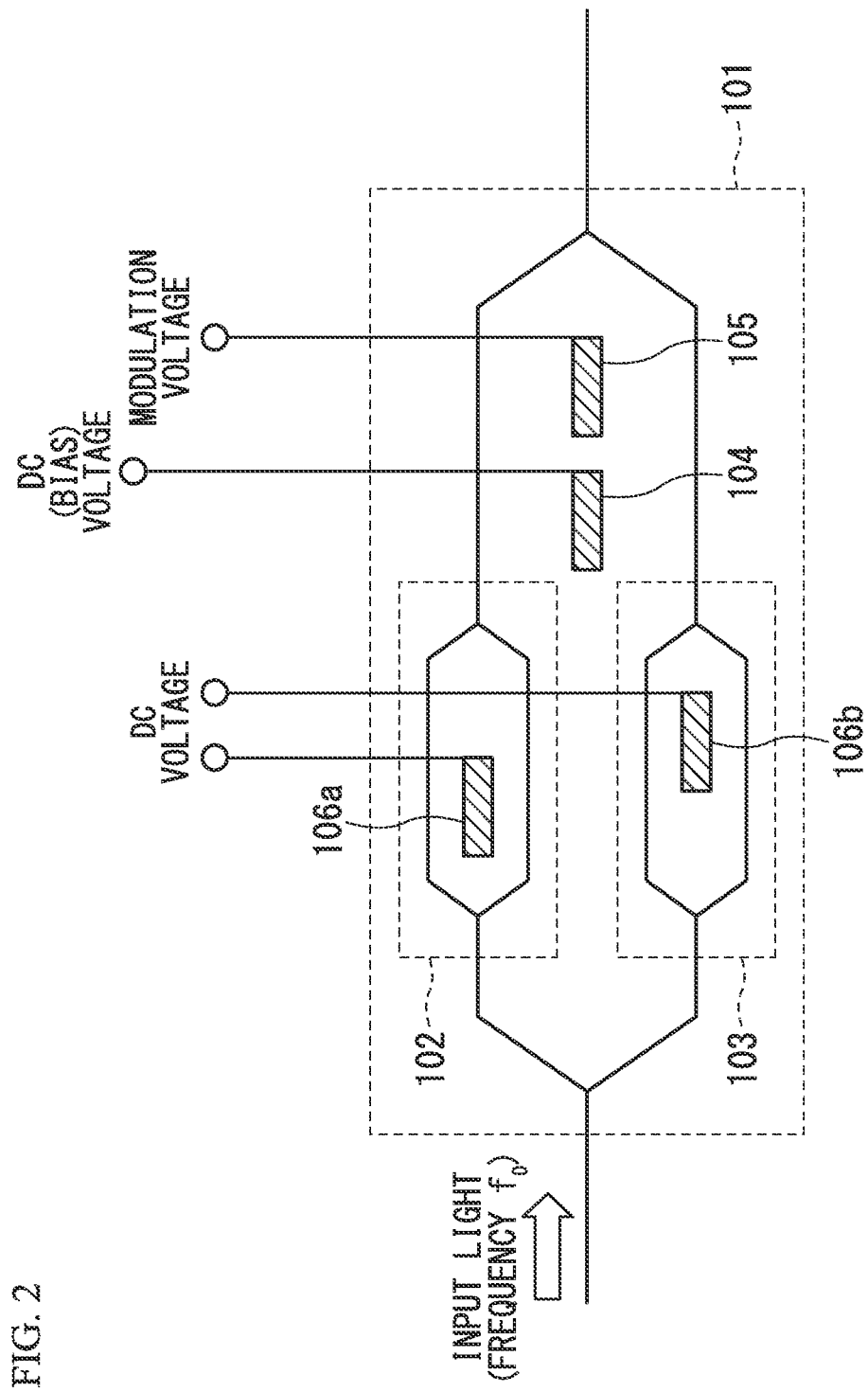
FIG. 2 is a configuration diagram of an optical modulator.

Next, the optical modulator 10 will be described referring to FIG. 2. FIG. 2 is a configuration diagram of the optical modulator 10.

In this drawing, the optical modulator 10 has an optical waveguide consisting of a main Mach-Zehnder optical waveguide (MZ-C) 101, a first sub Mach-Zehnder optical waveguide (MZ-A) 102 provided in one arm of the MZ-C 101, and a second sub Mach-Zehnder optical waveguide (MZ-B) 103 provided in the other arm of the MZ-C 101. The MZ-A 102 and the MZ-B 103 are respectively provided with DC electrodes 106a and 106b which adjust the phase difference of light passing through both arms, and the MZ-C 101 is provided with a DC electrode 104 which gives the phase difference of bias to light passing through both arms (MZ-A 102 and MZ-B 103), and a modulation electrode 105 which modulates light passing through both arms at the frequency $f_m$. The voltages (control signals) from the control means 17 are applied to the DC electrodes 106a, 106b, and 104, and a modulated signal at the frequency $f_m$ is applied to the modulation electrode 105 through an RF driver 16.

Though not shown, the optical modulator 10 has a configuration in which the above-described respective elements are formed on an LN substrate, which is a crystal having an electro-optical effect, and the refractive index of the optical waveguide changes with the electric field applied from each electrode, thereby giving a phase change to light passing through the optical waveguide.

If the voltage to be applied to the DC electrode 106a of the MZ-A 102 is changed, it is possible to adjust the phase difference of light passing through the respective arms of the MZ-A 102. Accordingly, it is possible to change power of light output from the MZ-A 102. The same applies to the MZ-B 103, and if the voltage to be applied to the DC electrode 106b of the MZ-B 103 is changed, it is possible to change the power of light output from the MZ-B 103.

If the voltage to be applied to the DC electrode 104 of the MZ-C 101 is changed, it is possible to adjust the phase difference between light which is output from the MZ-A 102 and passes through one arm of the MZ-C 101 and light which is output from the MZ-B 103 and passes through the other arm of the MZ-C 101.

In case that a phase difference it is given by the DC electrode 104, when light propagating through both arms of the MZ-C 101 is multiplexed, the carrier light $f_0$ interferes in the opposite phase, and the optical sideband components $f_{+1}$ and $f_{-1}$ generated by modulation interfere in the same phase. As a result, the output of the optical modulator 10 includes only the optical sideband components $f_{+1}$ and $f_{-1}$ while the carrier light $f_0$ disappears. However, when the MZ-A 102 and the MZ-B 103 are different in output light power, the carrier light $f_0$ in the opposite phase interferes but is not completely cancelled, and the carrier light $f_0$ remains in the output of the optical modulator 10.

Accordingly, in the optical carrier-suppressed signal generator 1 of this embodiment, in order to obtain output light having suppressed carrier light $f_0$ from the optical modulator 10, the control means 17 controls the voltages to be applied to the respective DC electrodes 106a, 106b, and 104 on the basis of the light-receiving power P1 of the first light-detection means 14a and the light-receiving power P2 of the second light-detection means 14b such that the amplitude of the time waveform of the light-receiving power P1 is minimized and the light-receiving power P2 is maximized.

A specific procedure of control has the following three steps. In the respective steps, it is assumed that a modulated signal is constantly applied to the modulation electrode 105.

First, the voltages to be applied to the three DC electrodes 106a, 106b, and 104 are adjusted and set such that the amplitude of the time waveform of the light-receiving power P1 is maximized and the light-receiving power P2 has a maximum value (first step). With this setting, in the MZ-A 102 and the MZ-B 103, the phase difference in both arms becomes zero, and the output light powers of each of the MZ-A 102 and the MZ-B 103 is maximized (however, both are different in power). In the MZ-C 101, the phase difference (the phase difference in output light between the MZ-A 102 and the MZ-B 103) of the two arms becomes zero.

Next, the voltage to be applied to the DC electrode 104 is adjusted in the above-described state and set such that the amplitude of the time waveform of the light-receiving power P1 is minimized (a minimum in this step, but not a final minimum) (second step). With this setting, in the MZ-C 101, since the phase difference between the two arms becomes π, the power of the carrier light $f_0$ included in the output light of the optical modulator 10 is minimized. However, since the output light power of the MZ-A 102 and the MZ-B 103 are different, the carrier light $f_0$ does not completely disappear and remains in the output light.

Finally, the voltages to be applied to the DC electrodes 106a and 106b are slightly adjusted to select a DC electrode on which the amplitude of the time waveform of the light-receiving power P1 changes in a decreasing direction, and the voltage to be applied to the selected DC electrode is adjusted and set such that the amplitude of the time waveform of the light-receiving power P1 is finally minimized (third step). With this setting, power of output light from a sub Mach-Zehnder optical waveguide (one of the MZ-A 102 and the MZ-B 103) having large output light power is attenuated and matches the output light power from the other sub Mach-Zehnder optical waveguide (the other one of the MZ-A 102 and the MZ-B 103). As a result, the output light from the optical modulator 10 includes only the optical sideband components $f_{+1}$ and $f_{-1}$ while the carrier light $f_0$ is completely suppressed (eliminated).

In regard to the split ratio of the first splitting means 11a, if output light intensity from the third splitting means 11c to the optical multiplexing means 13 is equal to carrier light intensity of the phase modulator 12, since a linearly polarized component of interference light to be obtained decreases and amplitude increases, whereby it becomes possible to set electrode bias with higher precision. To this end, in the respective steps, variable splitting means may be used such that the ratio of carrier light intensity of the optical modulator 10 and the phase modulator 12 substantially becomes 1:1. Even if the split ratio of the first splitting means 11a is fixed, the split ratio may be used insofar as the split ratio is within a range without departing from the effect of the invention.

After the control of the first to third steps is performed, for example, the phase state of the output light of each Mach-Zehnder optical waveguide may vary over time due to change in environmental temperature. In order to correct this variation, the control of the second step and the third step is constantly executed or repeatedly executed at every given time, thereby realizing high-precision optical modulation in real time.

Second Embodiment

Figure 4:
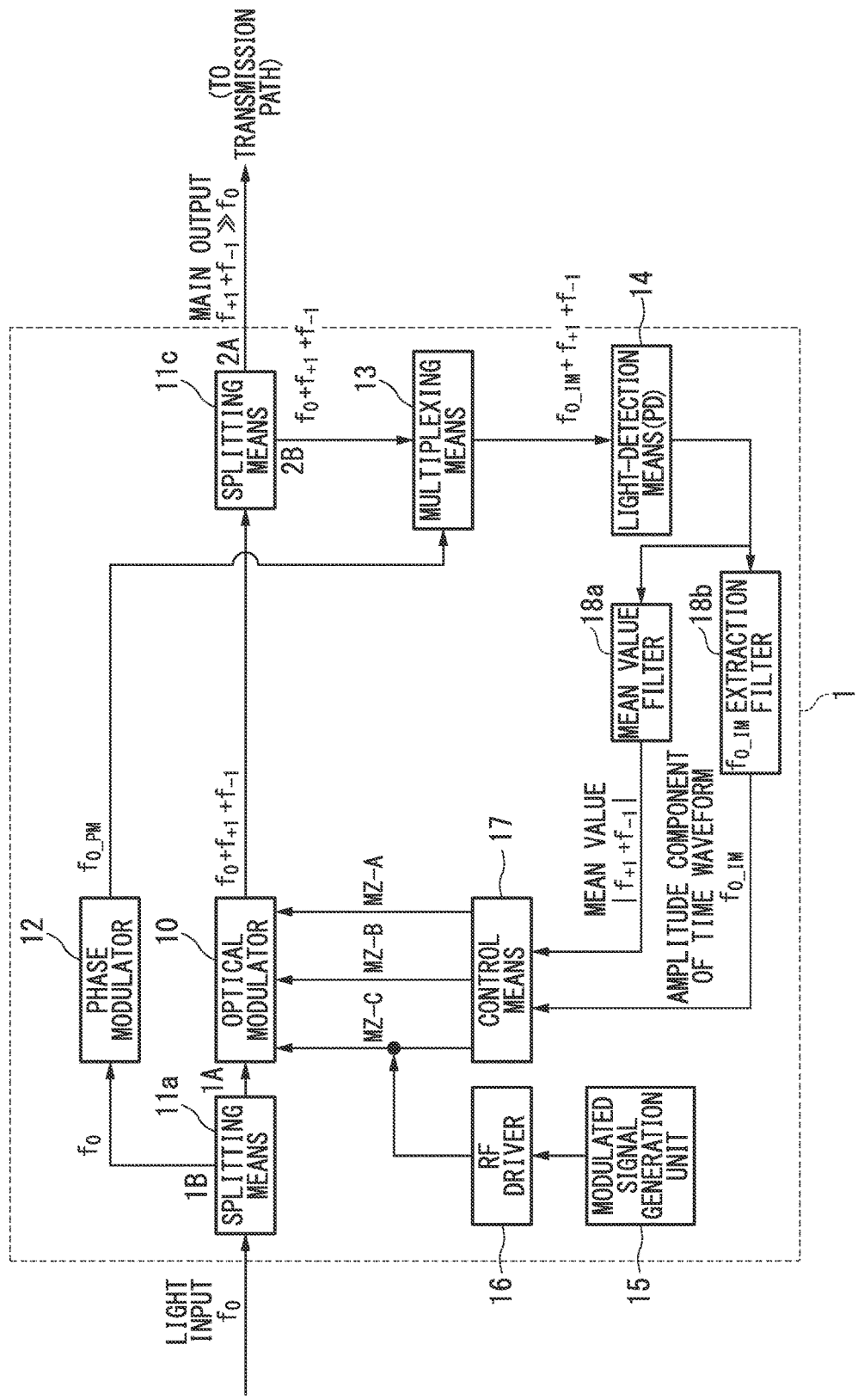
FIG. 4 is a configuration diagram of an optical carrier-suppressed signal generator according to a second embodiment of the invention.

FIG. 4 is a diagram showing the configuration of an optical carrier-suppressed signal generator 1 according to a second embodiment of the invention.

In this drawing, light (carrier light) of a frequency $f_0$ which is input light to the optical carrier-suppressed signal generator 1 is split into two light beams 1A and 1B by splitting means 11a, one light beam 1A is input to an optical modulator 10, and the other light beam 1B is input to a phase modulator 12.

The optical modulator 10 modulates the input light 1A in accordance with a modulated signal of a frequency $f_m$ generated by a modulated signal generation unit 15. The same optical modulator as in the first embodiment can be used as the optical modulator 10.

Output light from the optical modulator 10 is split into two light beams 2A and 2B by splitting means 11c, one light beam 2A is output to the transmission path as a main output of the optical carrier-suppressed signal generator 1, and the other light beam 2B becomes a first input to optical multiplexing means 13.

The phase modulator 12 performs phase modulation of the split light 1B from the splitting means 11a in accordance with a phase-modulated signal generated by a modulated signal generation unit (not shown). The same phase modulator as in the first embodiment can be used as the phase modulator 12. Accordingly, phase-modulated carrier light $f_{0\_PM}$ is output from the phase modulator 12. This phase-modulated carrier light becomes a second input to the optical multiplexing means 13.

The first input light 2B and the second input light to the optical multiplexing means 13 are multiplexed by the optical multiplexing means 13, and the multiplexed light becomes an input to light-detection means 14. The input light to the light detection means 14 is received by the light-detection means 14.

The first input light 2B to the optical multiplexing means 13 is the carrier light $f_0$ and the optical sideband components $f_{+1}$ and $f_{-1}$, and the second input light to the optical multiplexing means 13 is the phase-modulated carrier light $f_{0\_PM}$. If the first input light 2B and the second input light are multiplexed by the optical multiplexing means 13, the carrier light $f_0$ included in the first input light 2B and the phase-modulated carrier light $f_{0\_PM}$ which is the second input light interfere with each other, whereby only the carrier light is intensity-modulated at a modulation frequency $f_k$ (the same modulation frequency as the phase-modulated carrier light $f_{0\_PM}$). Carrier light $f_{0\_IM}$ which is intensity-modulated at the frequency $f_k$ and the optical sideband components $f_{+1}$ and $f_{-1}$ which are not intensity-modulated are output from the optical multiplexing means 13.

An electrical signal according to the input light intensity is output from the light-detection means 14 and is split into two signals. The two split electrical signals are respectively input to a mean value filter 18a and an $f_{0\_IM}$ extraction filter 18b. These filters are disposed to suppress control errors due to unnecessary signal components included in the electrical signals. The mean value filter 18a has a function of extracting only a frequency component equal to or lower than a predetermined frequency to output the power mean value $|f_{+1}+f_{-1}|$ of the input electrical signals. The $f_{0\_IM}$ extraction filter 18b has a function of extracting only a $f_{0\_IM}$ component (an integer multiple of the modulation frequency $f_k$ of the phase modulator) to output the amplitude component $f_{0\_IM}$ of the time waveform of the input electrical signals. The electrical signals output from the two filters are input to control means 17.

The extraction of the $f_{0\_IM}$ component by the $f_{0\_IM}$ filter 18b will be described in more detail. Before the electrical signal from the light-detection means 14 is input to the $f_{0\_IM}$ filter 18b, the output light 2B including the sidebands $f_{+1}$ and $f_{-1}$ and the output light of the phase modulator 12 interfere with each other in the optical multiplexing means 13. The interference light is detected by the light-detection means 14 as an optical signal including an interference signal of an integer multiple of the modulation frequency $f_k$ of the phase modulator 12 and converted to an electrical signal. In the $f_{0\_IM}$ filter 18b, only the $f_{0\_IM}$ component of an integral multiple of the modulation frequency $f_k$ is extracted from the electrical signal output from the light-detection means 14.

The components of the interference signal of the carrier light $f_0$ include not only the component of the modulation frequency $f_k$ which is a fundamental wave of driving of the phase modulator 12, but also harmonics, such as a second harmonic component and a third harmonic component of $f_k$.

The configuration from the carrier light $f_0$ being input to the optical carrier-suppressed signal generator 1 is split by the splitting means 11a to the split light beams being multiplexed by the optical multiplexing means 13 is the configuration of a type of optical interferometer, and the harmonic component may be greater than the component of the fundamental wave $f_k$ depending on the effective optical path length difference (a phase difference to be perceived by propagating carrier light) between the optical path on the optical modulator 10 side and the optical path on the phase modulator 12 side or the driving voltage of the phase modulator 12. The effective optical path length difference (phase difference) particularly affects the generation of the component of the second harmonic $2f_k$. When the effective optical path length difference (phase difference) is substantially 90° (corresponding to ¼ of the wavelength of light), the component of the second harmonic $2f_k$ is small. However, the component of the second harmonic $2f_k$ changes greatly with change in the effective optical path length difference (phase difference) due to minute change in temperature, weak vibration, mechanical strain, or the like caused by environmental change or disturbance in the optical interferometer having the above-described configuration. On the other hand, the amount of the driving voltage of the phase modulator 12 particularly affects the generation of the component of the third harmonic $3f_k$, and the component of the third harmonic $3f_k$ increases as the driving voltage increases. The generation of the harmonic component in the optical interferometer is described in NPL 2.

As described above, as a countermeasure against the above-described harmonic components of $f_k$, when coping with the environmental change or disturbance or optimizing the control of the optical modulator 10 while changing the driving conditions of the phase modulator 12, it is effective to monitor the harmonic components as well as the component of the fundamental wave $f_k$ of the driving of the phase modulator 12. At this time, the $f_{0\_IM}$ filter 18b may transmit the fundamental wave component and the harmonic components and the $f_{0\_IM}$ filter 18b may output an output signal in which the fundamental wave component and the harmonic components are mixed. In this case, since the optical modulator 10 is controlled such that the amplitude component of the time waveform signal is minimized in every component, there is no problem of control. It is needless to say that, when there is little influence of environmental change or disturbance or when the phase modulator 12 is driven under a specific condition, it is possible to select the signal of the fundamental component or a specific harmonic component to control the optical modulator 10. When the driving voltage of the phase modulator 12 is large, while fourth or higher harmonic components are generated, the generation rate is smaller than the second and third components. For this reason, in practice, if a third or lower component is extracted, a signal necessary for the control of the optical modulator 10 is obtained.

When driving the phase modulator 12 at $V\pi$ or an integer multiple of $V\pi$, the effect of stabilizing the mean level of the optical signal received by the light-detection means 14, the effect of reducing instability due to the drift of the phase modulator 12 and the effect of reducing the generation of the component of the second harmonic $2f_k$ are obtained.

It is reasonable that a filter through which harmonic components pass is selected as the $f_{0\_IM}$ extraction filter 18b in terms of improving resistance to change in the optical path difference due to environmental change or disturbance, or eliminating the need to particularly select the driving condition of the phase modulator 12. A bandpass filter through which the harmonic components pass is easily designed and manufactured, is available at low cost, and has an advantage of being able to be achieved with a reduction in cost. It is needless to say that, since the mean value filter 18a and the $f_{0\_IM}$ extraction filter 18b are separately provided for use, it is not necessary to split the input signal from the light-detection means 14 and to use the split signals, and an input signal portion may be commonly used and provided as a single body, or the mean value filter 18a and the $f_{0\_IM}$ extraction filter 18b may be switched temporally in time with the monitoring.

As the splitting means 11a, 11c, and the optical multiplexing means 13, the same as those in the first embodiment can be used.

The control means 17 generates a control signal on the basis of the electrical signals output from the mean value filter 18a and the $f_{0\_IM}$ extraction filter 18b, and supplies the control signal to the optical modulator 10, thereby controlling the modulation operation of the optical modulator 10. As in the first embodiment, this control is performed by individually adjusting the voltages (control signals) to be applied to the respective electrodes of the three Mach-Zehnder optical waveguides (MZ-A, MZ-B, and MZ-C) constituting the optical modulator 10.

The modulation operation of the optical modulator 10 in this embodiment can be performed in the same manner as in the first embodiment using the electrical signals output from the mean value filter 18a and the $f_{0\_IM}$ extraction filter 18b, instead of the light-receiving power P1 of the first light-detection means 14a and the light-receiving power P2 of the second light-detection means 14b in the first embodiment. The control means 17 controls the voltages to be applied to the DC electrodes 106a, 106b, and 104 such that the amplitude component $f_{0\_IM}$ of the time waveform output from the $f_{0\_IM}$ extraction filter 18b is minimized and the power mean value $|f_{+1}+f_{-1}|$ output from the mean value filter is maximized. Accordingly, in the optical carrier-suppressed signal generator 1, it is possible to obtain output light with suppressed carrier light $f_0$ from the optical modulator 10.

In the configuration in the second embodiment, since it is possible to reduce the splitting means 11b compared to the configuration of the first embodiment, it becomes possible to simplify the configuration and to reduce costs.

Although it should suffice that the mean value filter 18a can extract only a frequency component equal to or lower than a predetermined frequency component to output the power mean value $|f_{+1}+f_{-1}|$, if only a frequency component equal to or lower than ½ of the $f_{0\_IM}$ component is extracted, it is more effective in that control errors due to unnecessary signal components can be suppressed. In this embodiment, although the electrical signal from the light-detection means 14 is split into the two signals and the two signals are input to the control means 17, the electrical signal may be input to the control means 17 without being split to two signals, and may be split into two signals in the control means 17, and the above-described two types of filters may be incorporated in the split paths of the respective signals.

Third Embodiment

Figure 5:
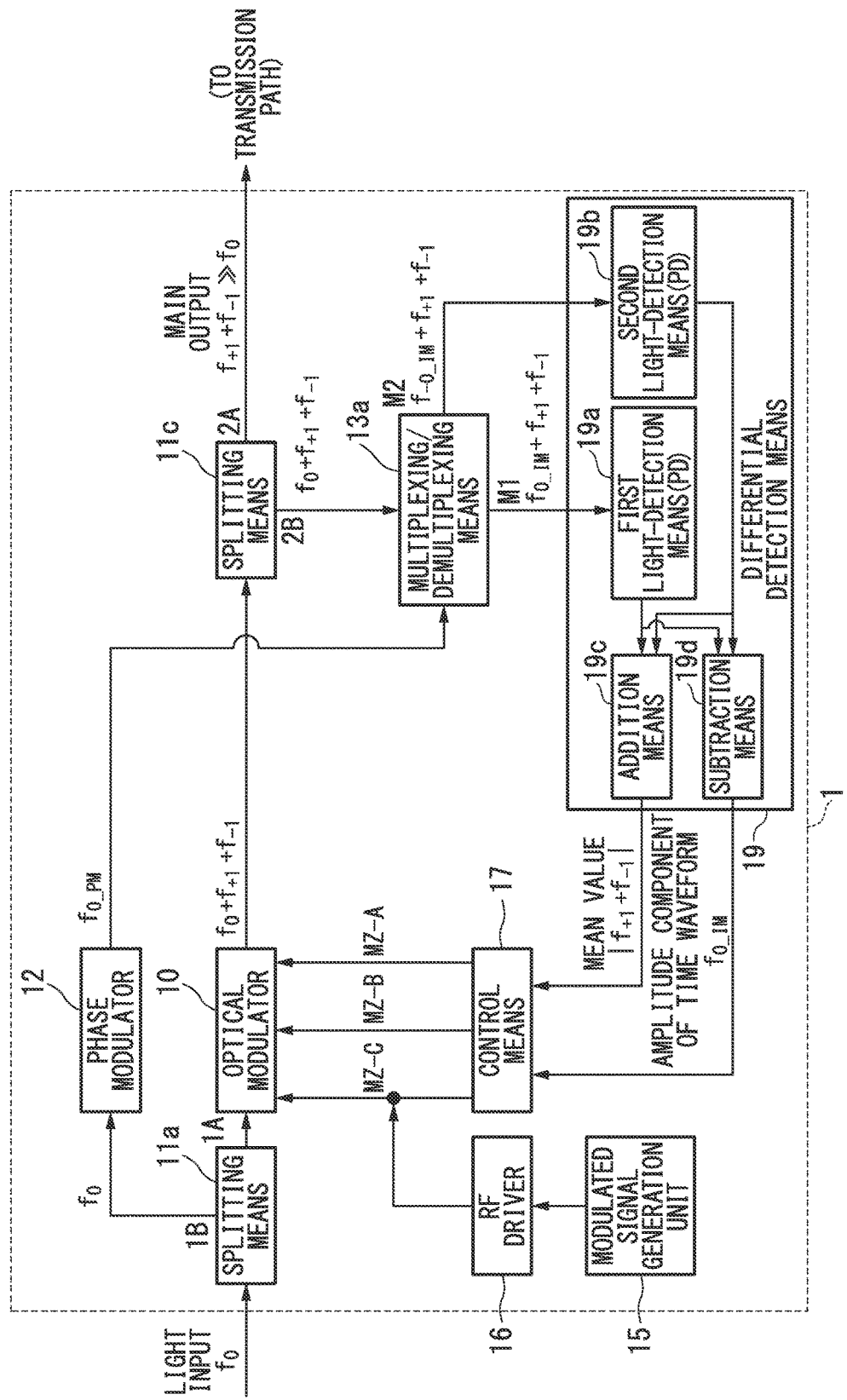
FIG. 5 is a configuration diagram of an optical carrier-suppressed signal generator according to a third embodiment of the invention.

FIG. 5 is a diagram showing the configuration of an optical carrier-suppressed signal generator 1 according to a third embodiment of the invention.

This embodiment is configured such that multiplexing/demultiplexing means 13A which multiplexes two input light beams and then outputs two output light beams at a given split ratio is used instead of the multiplexing means 13 in the configuration of the second embodiment, and the two output light beams are received by differential detection means 19, such as a differential PD.

The configuration until the input light to the optical carrier-suppressed signal generator 1 is input to the multiplexing/demultiplexing means 13a is the same as in the second embodiment, and thus a description thereof will not be repeated.

The first input light 2B and the second input light which are input from the splitting means 11c to the phase modulator 12 to the multiplexing/demultiplexing means 13a are multiplexed by the multiplexing/demultiplexing means 13a and interfere with each other, and are then output as two split light beams M1 and M2 split at a given split ratio. As one split light beam M1, the carrier light $f_{0\_IM}$ which is intensity-modulated by interference at the frequency $f_k$ and the optical sideband components $f_{+1}$ and $f_{-1}$ which are not intensity-modulated by interference are output from the multiplexing/demultiplexing means 13a, and the split light M1 becomes an input to first light-detection means 19a of the differential detection means 19. As the other split light beam M2, $f_{-0\_IM}$ which is carrier light intensity-modulated by interference at the frequency $f_k$ and has an opposite phase to $f_{0\_IM}$ and the optical sideband components $f_{+1}$ and $f_{-1}$ which are not intensity-modulated by interference are output from the multiplexing/demultiplexing means 13a, and the split light M2 becomes an input to second light-detection means 19b of the differential detection means 19.

In the first light-detection means 19a, the split light M1 from the multiplexing/demultiplexing means 13a is received, an electrical signal according to the light-receiving power is split into two signals, and the two signals are respectively output to addition means 19c and subtraction means 19d. In the second light-detection means 19b, the input light M2 from the multiplexing/demultiplexing means 13a is received, an electrical signal according to the light-receiving power is split into two signals, and the two signals are respectively output to the addition means 19c and the subtraction means 18d.

In the addition means 19c, the electrical signals from the first light-detection means 19a and the second light-detection means 19b are input, the two signals are added, and the result is output and becomes an input to the control means 17. In the subtraction means 19d, the electrical signals from the first light-detection means 19a and the second light-detection means 19b are input, and the difference between the two signals is output and becomes an input to the control means 17.

The multiplexing/demultiplexing means 13a is, for example, a fiber-type optical coupler having a fixed split ratio. Each of the first and second light-detection means 19a and 19b has a photodiode (PD) which converts power (intensity) of received light signal to an electrical signal.

The control means 17 generates a control signal on the basis of the two electrical signals output from the differential detection means 19, and supplies the control signal to the optical modulator 10, thereby controlling the modulation operation of the optical modulator 10. As in the first embodiment, this control is performed by individually adjusting the voltages (control signals) to be applied to the three Mach-Zehnder optical waveguides (MZ-A, MZ-B, and MZ-C) constituting the optical modulator 10.

The modulation operation of the optical modulator 10 in this embodiment can be performed in the same manner as in the first embodiment using the each electrical signal output from the subtraction means 19d and the addition means 19c of the differential detection means 19, instead of the light-receiving power P1 of the first light-detection means 14a and the light-receiving power P2 of the second light-detection means 14b in the first embodiment. The control means 17 controls the voltages to be applied to the DC electrodes 106a, 106b, and 104 such that the amplitude $f_{0\_IM}$ of the time waveform of the optical power differential component detected by the subtraction means 19d of the differential detection means 19 is minimized and the value of $|f_{+1}+f_{-1}|$ from the DC component of the optical power component detected by the addition means 19c of the differential detection means 19 is maximized. Accordingly, in the optical carrier-suppressed signal generator 1, it is possible to obtain output light with suppressed carrier light $f_0$ from the optical modulator 10.

In the configuration of the third embodiment, since it is possible to input a necessary signal component to the control means 17 without preparing a special filter, it becomes possible to simplify the configuration and to reduce costs.

As in the second embodiment, a mean value filter which transmits the power mean value or a $f_{0\_IM}$ extraction filter which transmits the amplitude component $f_{0\_IM}$ of the time waveform may be disposed between the differential light-detection means 19 and the control means 17. In this case, it is possible to improve the S/N ratio and to improve control precision.

Although the respective embodiment of the invention have been described in detail referring to the drawings, a specific configuration is not limited to the above-described configurations, and various design changes and the like may be made without departing from the scope of the invention.

Figure 6:
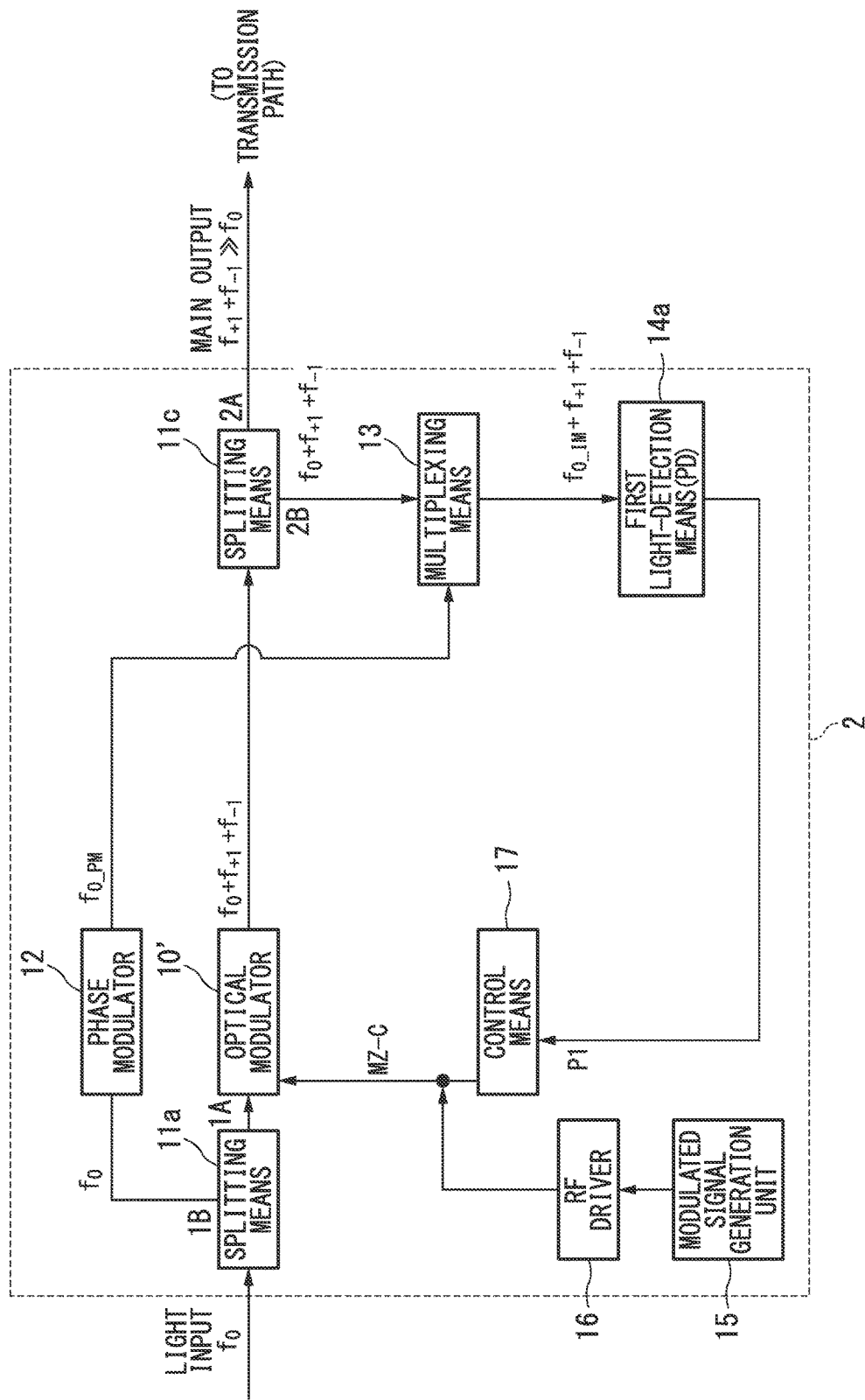
FIG. 6 is a configuration diagram of an optical carrier-suppressed signal generator according to a modified embodiment of the invention.

For example, the invention may be applied to a case where the waveguide configuration of an optical modulator is a single Mach-Zehnder optical waveguide. A single Mach-Zehnder optical waveguide has a configuration in which, the first sub Mach-Zehnder optical waveguide 102 and the second sub Mach-Zehnder optical waveguide 103 in FIG. 2, 5, or 6 are replaced with linear waveguides. The configuration of an optical carrier-suppressed signal generator 2 using an optical modulator 10' of this waveguide configuration is shown in FIG. 6. The optical carrier-suppressed signal generator 2 has a configuration in which the splitting means 11b and the second light-detection means 14b are omitted from the optical carrier-suppressed signal generator 1 shown in FIG. 1. In this optical carrier-suppressed signal generator 2, in order to obtain output light with suppressed carrier light $f_0$ from the optical modulator 10', the control means 17 controls the voltage to be applied to the DC electrode 104 on the basis of the light-receiving power P1 of the first light-detection means 14a such that the amplitude of the time waveform of the light-receiving power P1 is minimized. With this control, the voltage to be applied to the DC electrode 104 is adjusted such that the phase difference between two arms (corresponding to the two arms of the main Mach-Zehnder optical waveguide 101 of FIG. 2) of the single Mach-Zehnder optical waveguide of the optical modulator 10' becomes it, and the carrier light $f_0$ is suppressed (eliminated).

INDUSTRIAL APPLICABILITY

According to the invention, it is possible to stably suppress carrier light with a simple and low-cost configuration when modulating the carrier light to generate optical sideband components. In the related art, in regard to the lower limit of the wavelength difference between carrier light and modulated optical sideband components, although the bandwidth or wavelength characteristic of the optical filter is steeply restricted, in this system, it is possible to expand the lower limit of the wavelength difference to about the beam width of carrier light. As described above, the invention can be used for an optical carrier-suppressed signal generator and is industrially very useful.

REFERENCE SIGNS LIST 1, 2: optical carrier-suppressed signal generator
10, 10': optical modulator 11a, 11b, 11c: splitting means
12: phase modulator
13: optical multiplexing means
13a: multiplexing/demultiplexing means
14: light-detection means
14a: first light-detection means
14b: second light-detection means
15: modulated signal generation unit
16: RF driver
17: control means
18a: mean value filter
18b: $f_{0\_IM}$ extraction filter
19: differential detection means
19a: first light-detection means
19b: second light-detection means
19c: addition means
19d: subtraction means
101: main Mach-Zehnder optical waveguide
102: first sub Mach-Zehnder optical waveguide
103: second sub Mach-Zehnder optical waveguide
104: DC electrode
105: modulation electrode
106a, 106b: DC electrode

We claim:

1. An optical carrier-suppressed signal generator comprising:

first splitter used to split input carrier light into two light beams 1A and 1B;

an optical modulator which modulates one split carrier light beam 1A and outputs light including optical sideband components;

a phase modulator which phase-modulates another split carrier light beam 1B;

second sputter used to split the output light of the optical modulator into two light beams 2A and 2B;

third splitter used to split one output ht beam 2A of the second splitter into two light beams 3 A and 3B;

optical multiplexer used to multiplex one output light beam 3B of the third splitter and output light of the phase modulator;

first light-detector used to detect output light of the optical multiplexer;

second light-detector used to detect another output light beam 2B of the second splitter; and controller used to control the optical modulator such that amplitude of time waveform of optical power detected by the first light-detector is minimized and mean value of optical power detected by the second light-detector is maximized.

2. The optical carrier-suppressed signal generator according to claim 1, wherein the optical modulator is an optical single side band SSB modulator.

3. The optical carrier-suppressed signal generator according to claim 1, wherein polarization is adjusted such that one output light beam 3B of the third splitter and the output light of the phase modulator interfere with each other in the optical multiplexer.

4. The optical carrier-suppressed signal generator according to claim 1, wherein the first splitter has a variable split ratio.

* * * * *